United States Patent [19]

Huebner

[11] 3,824,845

[45] July 23, 1974

[54] METHOD OF TRANSFERRING ELECTRICAL DATA SIGNALS FROM MOVING BODIES

[75] Inventor: H. Douglas Huebner, Newport News, Va.

[73] Assignee: Newport News Shipbuilding & Dry Dock Company, Newport News, Va.

[22] Filed: Dec. 22, 1972

[21] Appl. No.: 317,865

[52] U.S. Cl............................. 73/88.5 R, 73/136 A
[51] Int. Cl............................. G01l 3/10, G01n 3/00
[58] Field of Search............ 73/88.5 R, 133, 136 R, 73/141 R, 136 A

[56] References Cited
UNITED STATES PATENTS

| | | | |
|---|---|---|---|
| 3,000,208 | 9/1961 | Piazza............................ | 73/88.5 R X |
| 3,201,982 | 8/1965 | Kennedy........................... | 73/136 R |
| 3,224,257 | 12/1965 | Takami et al.................. | 73/136 R X |
| 3,434,343 | 3/1969 | Senour........................... | 73/88.5 R X |
| 3,757,580 | 9/1973 | Crocker et al............... | 73/88.5 R X |

OTHER PUBLICATIONS

Active Filters: Lumped, Distributed, Integrated, Digital, and Parametric; Huelsman, Lawrence P., New York, McGraw-Hill, 1970 Pgs.8–12.

*Primary Examiner*—Richard C. Queisser
*Assistant Examiner*—Stephen A. Kreitman

[57] ABSTRACT

Method of transferring electrical data signals from moving bodies, particularly low frequency, low level signals such as generated by strain gages. The method is distinguished in its use of an input holding capacitor to transmit low impedance signals while eliminating high impedance signals, such that a continued output signal is provided, notwithstanding discontinuous contact between sliding contact devices attached to the moving body and brushes attached to the receiving signal circuit.

6 Claims, 7 Drawing Figures

TYPICAL SIGNAL ACROSS SECOND SLIP RING SET

TYPICAL SIGNAL ACROSS BRUSHES AT SECOND SLIP RING SET

EFFECT OF LOW PASS FILTERING ONLY

EFFECT OF INPUT HOLDING CAPACITOR

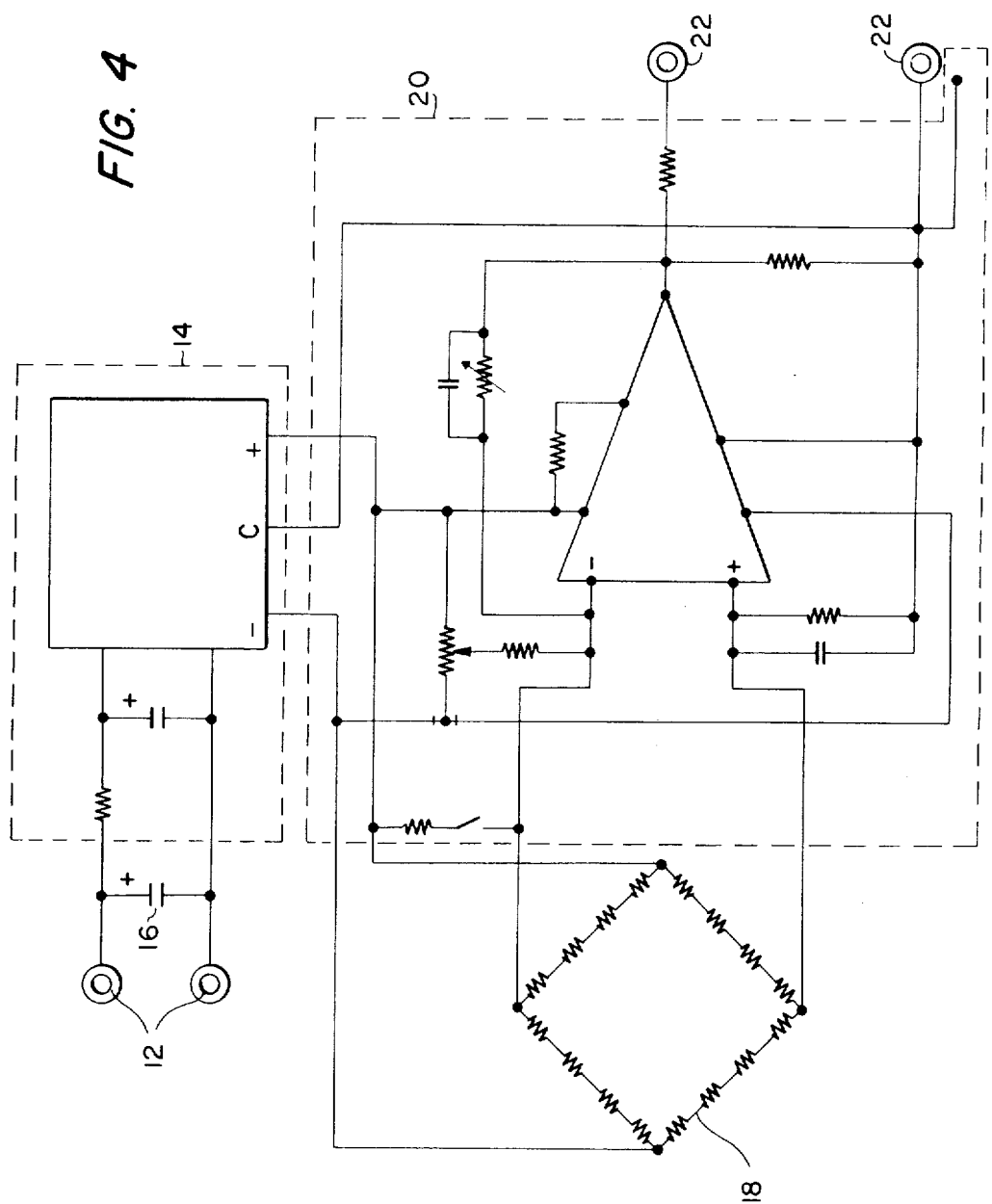

METHOD OF TRANSFERRING ELECTRICAL DATA SIGNALS FROM MOVING BODIES

BACKGROUND OF THE INVENTION

1. Field of the Invention

Removal of electrical data signals from moving bodies, such as in rotating shafts in ship's protrusion systems. For example, the measuring of strains and temperatures on rotating shafts which are transmitting torque or thrust, or are supporting a load. Systems such as the use of brush and slip rings have been employed. However, the brush and slip ring method suffers from brush bounce which precludes 100 percent efficient electrical contact. Alternatively, telemetry, rotating capacitors, rotating transformers and ionic brushes have been employed. However, such equipment is complex, expensive, and cumbersome or difficult to maintain. Frequently, this complex equipment requires access to an end of the rotating member which is not always possible.

2. Description of the Prior Art

| SILVERMAN | 2,978,600 |
| VAN DEVENTER | 1,533,525 |
| HARTENSTEIN | 3,305,801 |

Silverman is specific to the employment of ionic brushes to obtain consistent contact with the rotating shaft.

Van Deventer's combination electric battery and condenser provides an output voltage which is the average output voltage of the battery. The circuit is thus responding to voltage changes at all times. There is no suggestion of providing a continuous signal, absent the noise generation within the battery. The capacitor is thus non-discriminatory.

Hartenstein U.S. Pat. No. 3,305,801, variable time constant smoothing circuit, employs a capacitor to reduce noises in electrical signal pulses. A non-linear circuit element is introduced to create a dead zone for noise suppression. The element is non-linear both with respect to applied voltage and in a deterministic manner, that is the output voltage is a non-linear, but known function of the input voltage. There is no suggestion of eliminating the effects of unwanted non-linearity, for example, bouncing mechanical contacts. Nor is their suggestion of eliminating non-linearity which is non-linear in time, rather than voltage.

SUMMARY OF THE INVENTION

According to the present invention, electrical data signals are transferred from a moving body having sliding contacts by first transmitting an excitation signal into the moving body, transducing the signal as a low impedance output signal from said body, while differentially amplifying the output signal by contacting said body such that the low impedance signals received from the rotating shaft charge a capacitor so as to produce a continuous signal output while eliminating high impedance signals. As a result, there is a continuous output signal, notwithstanding those times of high impedance when the sliding contact device experiences bounce. Embodiments of the method include the transfer of electrical data signals through any mechanical contacts moving relative to each other such as circular sliding contacts or reciprocating sliding contacts.

BRIEF DESCRIPTION OF THE DRAWINGS

FIG. 4 is a circuit diagram of a proposed on-shaft circuit.

DESCRIPTION OF THE PREFERRED EMBODIMENTS

The purpose of the present invention is to provide a relatively inexpensive, easily installed method of transmitting analog or digital electrical data signals from moving bodies. The system will be described as applied to a rotating shaft but it should be understood that the method is applicable to any body moving relative to its environment. The system is basically a slip ring system employing special circuitry to provide a high fidelity output signal. The circuit eliminates brush to ring contact noise.

Figure 1:
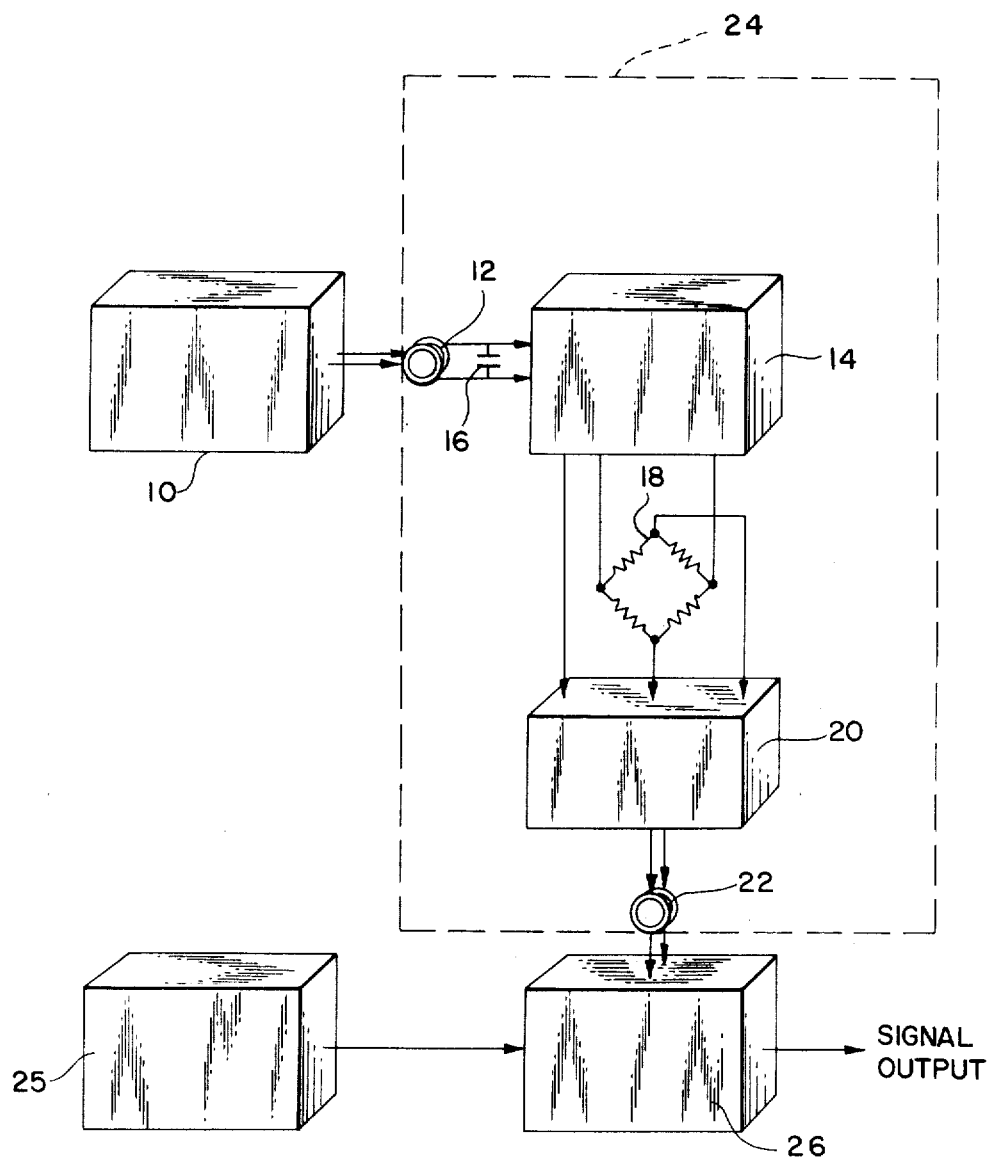
FIG. 1 is a block diagram of a proposed system for transferring electrical data signals from a rotating shaft and including both an off-shaft system component and an on-shaft component.

The system is shown in FIG. 1. Operation is as follows:

Off-shaft power supply 10 provides excitation power via a first slip ring pair 12 to the on-shaft power supply 14 in on-shaft circuit 24. This on-shaft power supply 14 is provided with a large input capacitor 16 or other energy storage devices which can provide continuous excitation power to the on-shaft system even though brush (not illustrated) to slip ring 12 contact may momentarily break. The on-shaft power supply powers both the strain gage bridge 18 (or other electrical transducer which may require electrical power), and an on-shaft amplifier 20. The purpose of amplifier 20 is twofold. First, amplifier 20 may provide signal conditioning, i.e., voltage gain, filtering, etc. Secondly, amplifier 20 provides a low impedance output signal. This output signal is transmitted via a second slip ring pair 22 and brushes 28 to the off-shaft signal receiving circuit 26.

Figure 2:
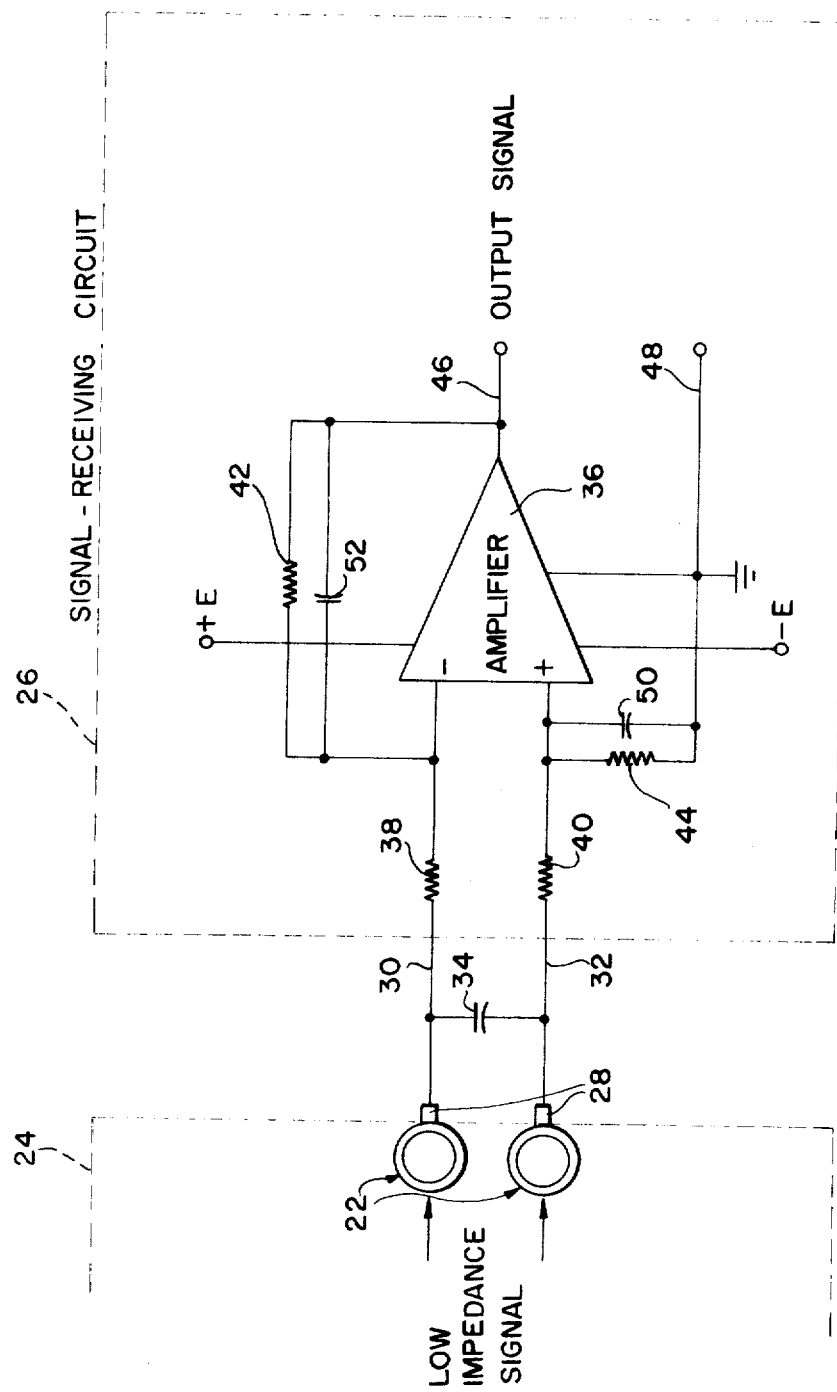
FIG. 2 is a circuit diagram of the proposed signal receiving circuit contacting by means of slip rings attached to the rotating shaft.

The off-shaft signal receiving circuit 26, powered by DC power supply 25 is shown in FIG. 2. It is basically a low pass, differential amplifier having an input holding capacitor 34 between the input leads 30–32. Input impedance to the amplifier must be at least moderately high. When good electrical contact is made between the brushes 28 and slip rings 22, the input holding capacitor 34 quickly changes to the signal voltage through the low impedance signal source (the on-shaft amplifier 20). Suitable resistors 38, 40, 42 and 44 may be employed respectively in the input leads 30–32, as well as in the output lead 46 and common lead 48 for purposes well known in the art. Also, as illustrated in FIG. 2 suitable condensers 50, 52, may be employed respectively between the input lead 32 and common lead 48, as well as between input lead 30 and output lead 46 for conventional, low pass filtering.

If slip ring 22 contact is momentarily lost due to brush 28 bounce or dirt, the input holding capacitor 34 will hold the last valid signal level until good electrical contact is reestablished. When good contact is made, input capacitor 34 again very quickly charges (or discharges) to the true signal voltage. The value of input capacitor 34 is chosen on the basis of desired charging and discharging times, and contact bounce duration. A value of 20 microfarads where the charging resistance is 10 ohms and the discharging resistance is 200k ohms is typical.

FIG. 3 demonstrates the effect of input holding capacitor 34. FIG. 3A shows a typical data signal as it exists across the second on-shaft slip ring pair 22. FIG. 3B shows the signal as it would exist across the brushes 28 as the result of brush bounce with no further manipulation of the signal. FIG. 3C shows the result of passing the waveform shown in FIG. 3B through a low pass filter; such a filter would "clean up" the signal to some extent but appreciable distortion is still present. FIG. 3D shows the output signal 46 with the input holding capacitor 34 in place in the off-shaft circuit 26 as shown in FIG. 2.

Figure 3A:
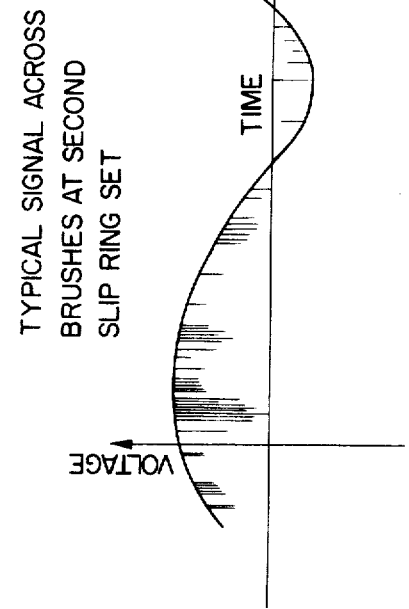
FIGS. 3A, 3B, 3C and 3D are circuit wave forms showing the effect of using the input holding capacitor in the signal receiving circuit.
Figure 3B:
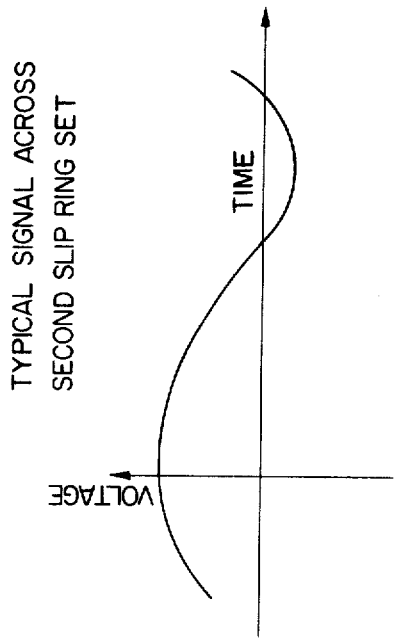
Figure 3C:
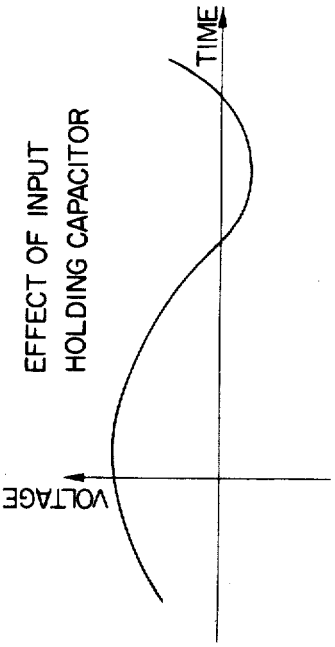
Figure 3D:
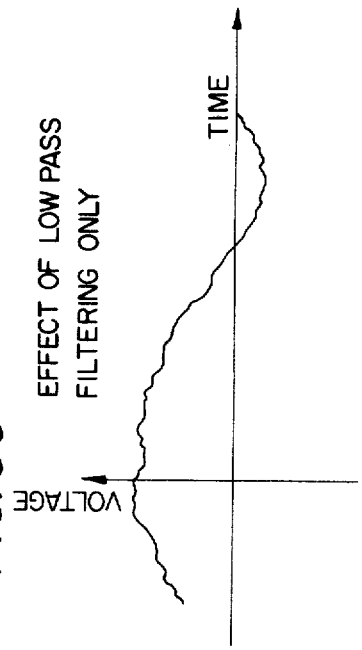

As demonstrated by FIG. 3D, the addition of the capacitor 34 substantially improves the quality of the signal. It should be emphasized that input holding capacitor 34 does not simply "filter out" the slip ring 22 induced noise in the usual sense, or provide an average value of the voltage received from slip rings 22. Rather, input holding capacitor 34 enables the off-shaft amplifier 36 to produce an accurate replica of the signal as it exists across slip rings 22.

The advantage of the present system is that it is easily implemented to provide an accurate, noise free output signal from a source on a moving body. Simple sliding contact devices are adequate to provide a usable signal. Precision sliding contact devices made of expensive materials are not needed. This is especially important if the system need be installed on an existing facility where precision work may be physically difficult. In the present system, the circuitry — specifically the input holding capacitor 34 in conjunction with a low charging impedance and high discharging impedance — provides the clean output signal as at 46 from the nonprecision slip rings.

It must be recognized, of course, that the period of the data signal must be long relative to the contact bounce time of (typically) 1 millisecond.

I claim:

1. A method of transferring electrical data signals from a moving body comprising:
   A. conducting an excitation signal into said moving body through a first sliding contact device;
   B. modifying said signal such that it is representative of a physical parameter of said body;
   C. conditioning said signal to provide a low impedance output signal;
   D. conducting said output signal off said body through a second sliding contact device which is in parallel with a holding capacitor;
   E. detecting said output signals across said holding capacitor by means of a high impedance circuit such that said capacitor holds the value of the output signal during moments when said second sliding contact device experiences electrical discontinuities between the contacts; and
   F. registering said output signal as an indication of said physical parameter of said body.

2. A system of transferring electrical data signals from rotating shafts comprising:
   A. an off-shaft circuit including:
      i. a DC power supply in electrical contact with a rotating shaft; and
      ii. a signal receiving circuit in electrical contact with said rotating shaft; and
   B. an on-shaft circuit positioned intermediate said DC power supply and said signal receiving circuit and further including electrically connected in said on-shaft circuit:
      i. a power supply connected to receive power from said DC power supply;
      ii. a capacitor connected between said rotating shaft and said power supply;
      iii. a strain gage bridge connected to said power supply; and
      iv. an amplifier electrically connected to said strain gage bridge.

3. A system of transferring electrical data signals from rotating shafts as in claim 2, wherein said signal receiving circuit includes:
   A. a pair of brushes in contact with said shaft;
   B. electrical leads from said brushes;
   C. an input holding capacitor connected between said leads; and
   D. an amplifier connected to said leads subsequent to said input holding capacitor.

4. A system of transferring electrical data signals from rotating shafts as in claim 3, wherein said signal receiving circuit has a low charging impedance and a high discharging impedance.

5. A system of transferring electrical data signals from rotating shafts as in claim 4, wherein said shafts are supplied with slip rings contactable with said brushes.

6. A system of transferring electrical data signals from rotating shafts as in claim 5, wherein said receiving circuit capacitor has a value of 20 microfarads with a charging resistance of 10 ohms and a discharging resistance of 200k ohms.

* * * * *